3,326,742
SURFACE TREATMENT AND BONDING OF
ORGANIC HIGH POLYMERS
Thomas H. Shepherd, Hopewell, N.J., assignor to Princeton Chemical Research, Inc., Princeton, N.J., a corporation of Delaware
No Drawing. Filed Mar. 25, 1963, Ser. No. 267,852
24 Claims. (Cl. 161—227)

This invention relates to new and useful improvements in the surface treatment and bonding of organic high polymers. The invention more particularly relates to a process for altering the surface characteristics of hydrogen-containing organic high polymers so as to render the same more adherent and/or more receptive to adhesives, printing inks, dyes, and the like, and to a process for directly bonding such polymers without the use of a separate binding agent.

Many organic high polymer materials have surface characteristics which render the same difficult to bond using conventional bonding agents and methods and difficult to dye, print and the like. Various proposals have been made to overcome these disadvantages. Thus, in connection with polyethylene terephthalate, it has been suggested to overcome this disadvantage by treatment with chromic acid, by subjecting the same to an ozonization treatment by flaming or by exposing the same to an electric arc at elevated temperatures. Proposals have also been made to use specialized adhesive materials.

These prior art treatments, however, generally require the use of strong reagents and severe conditions which may have undesirable and adverse effects on the material, as for example causing degradation or discoloration thereof.

One object of this invention is a process for rendering organic high polymer surfaces more adherent and receptive to adhesive and bonding agents without degrading or discoloring the material.

A further object of this invention is a process for the surface treatment of organic high polymers in order to increase the receptivity thereof to various materials such as printing inks and dyes without causing degradation or discoloration.

A still further object of this invention is a process for firmly and securely bonding organic high polymers without adversely affecting the desirable characteristics or appearance of the polymer.

These and still further objects will become apparent from the following description.

In accordance with the invention the organic high polymers are surface treated by contacting the same with certain specific classes of N-halogenated amine compounds at a temperature of at least 90° C. This renders the surface of the plastic mode adherent without degrading or discoloring the plastic so that, for example, the material may be easily and securely bonded with conventional bonding agents and adhesives.

Alternately, the organic high polymers may be directly bonded by contacting the polymer surface with the surface of the material to be bonded thereto while maintaining the N-halogenated amine compounds therebetween and heating the same to a temperature of at least 90° C.

The organic high polymers which may be treated in accordance with the invention comprise any hydrogen-containing organic high polymer, the term "high polymer" being used to designate any of the plastic materials which are solid at normal temperatures. The invention is particularly applicable to the treatment of polymers which are normally difficult to bond with other materials as for example, polyesters, such as polyethylene terephthalate; polyethylene isophthalate-terephthalate copolymers, poly-(1,4-cyclohexane dimethylene)terephthalate; poly (1,4-cyclohexane dimethylene) isophthalate; and isophthalate-terephthalate copolymers; poly (1,4 phenylene) terephthalate and isophathalate and copolymers; poly (1,4-phenylene)-4,4' diphenyl dicarboxylate; polyesters derived from aliphatic dibasic acids, such as maleic, adipic and sebacic acids and polyhydroxy compounds such as butylene glycol, glycerol, pentaerythritol, and cellulose; polyacetals as for example polyformaldehyde, polyacetaldehyde, or copolymers of formaldehyde or acetaldehyde with minor amounts of other monomers; polycarbonates, as for example condensation products of phosgene with bis-phenol-A, hydroquinone, or 4,4'-methylene-bis-phenol; vinyl polymers, as for example, polyvinyl fluoride, polyvinyl alcohol; polyacrylonitrile; poly-α-methylstyrene; copolymers of α-methylstyrene with methylmethacrylate, acrylate esters, acrylonitrile, etc.; poly-p-isopropenyl-toluene, copolymers of p-isopropenyl toluene with acrylonitrile, methylmethacrylate, acrylate esters, styrene, etc. polyolefins such as polyethylene, polypropylene, polybutene-1, (including the higher molecular, linear and isotactic members of this group), isotactic polystyrene, polyamides, such as the various nylons, as for example Nyon 6, Nylon 66, thermosetting resins, such as the epoxides, melamine, phenolic resins, the urea formaldehyde resins, polyurethanes, polyesters, alkyds, casein, and the like, cellulose resins such as cellulose triacetate and the like.

The N-halogenated amine compounds useful in accordance with the invention are any N-chlorinated and/or brominated amine compounds in which the nitrogen atom of the amine is connected to, or forms part of an electro negative organic radical, i.e. a radical having electron withdrawing ability. Such electro negative organic radicals are preferably radicals containing the group

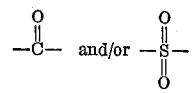

or fused ring systems containing the halogenated nitrogen atom. The N-halogenated amine compounds may thus be represented by the formula:

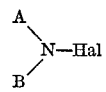

in which Hal represents chlorine or bromine, and A represents the electro-negative organic radical. B may represent hydrogen, chlorine, bromine or any organic radicals. These organic radicals as represented by B may be aromatic or alkyl, may be substituted, or may be an electro negative organic radical similar to or differing from A.

may also be an electro negative heterocyclic radical as, for example, triazine, maleimidyl, phthalimidyl, imidazoyl, benzimidazoyl, pyridyl, and hydantoins.

A class of N-halogenated amine compounds useful in accordance with the invention may be represented by the formula:

in which X is chlorine or bromine, Z is

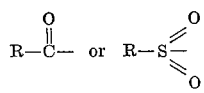

(R representing an organic radical) and Y may be hydrogen, chlorine, bromine, an organic radical, such as an aromatic or substituted aromatic nucleus, or alkyl, or substituted alkyl radical, or a radical corresponding to Z including a ring system sharing the same radical represented by R with Z. In this latter case, for example, the radical R which is common to both Z and Y may be represented by an alkylene radical or substituted alkylene radical, o-phenylene, substituted o-phenylene, or a uredi radical which may be substituted.

Examples of aromatic nuclei which are represented by R include phenyl, naphthyl, phenanthryl, anthracenyl, pyridyl, imidazoyl, benzimidazoyl, and the like.

These may be substituted by, for example, alkyl groups containing from 1 to 20 carbon atoms, by halogen, nitrile, nitro, carboxyl, nitroso, carboxylic acid halides, or anhydrides, sulfonyl halides, sulfones, alkoxyl, containing 1–20 carbon atoms, dialkyl amino, phenyl, naphthyl, etc.

The organic radicals represented by R may, for example be alkyl, have from 1 to 20 and preferably 1 to 16 carbon atoms and may be unsaturated and/or substituted by nitrile, halogen, dialkylamino, nitro, alkoxy, phenol, naphthyl, or the like.

Examples of such of the substituted alkyl groups include α-phenylethyl, β-styryl, α-chloroethyl, α-methoxyethyl, dimethylaminomethyl, bromomethyl, crotyl, furfuryl, tetrahydrofurfuryl, cyanomethyl, etc.

Where Z and Y are connected together by the organic radical (N-halogenated imides) R, for example may be an alkylene radical which may be unsaturated or substituted as, for example, alkylene radicals having from 1 to 9 carbon atoms and preferably 2 to 3 carbon atoms which may be substituted with halogen, nitrile, nitro, alkyl groups containing 1–20 carbon atoms, dialkyl amino, alkoxy, phenyl, naphthyl, benzoyl, etc. as for example

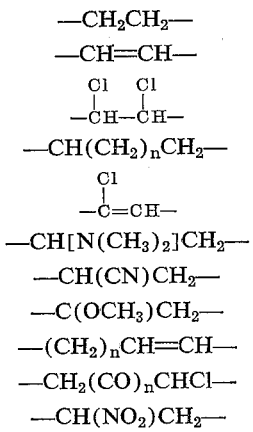

or may be o-phenylene or an ophenylene which is substituted as for example with halogen, nitrile, carboxyl, alkyl groups containing 1–20 carbon atoms, dialkyl amino, nitro, carboxylic acid halides or anhydrides, sulfonyl halides, sulfones, alkaryl, containing 1–20 carbon atoms, phenyl or as for example, tetrachloro-o-phenylene; tetrabromo-o-phenylene; 3-nitro-o-phenylene; 3-cyano-o-phenylene; 3-ethyl-o-phenylene; 3-methoxy-o-phenylene; 3-dimethylamino-o-phenylene; o-phenylene - 3 - sulfonyl chloride; o-phenylene-3,4-dicarboxylic anhydride. R may still further represent:

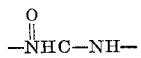

(uredio radical) which may be substituted as for example with alkali metal ions, halogen, alkyl groups containing 1 to 20 carbon atoms, aromatic nuclei, dialkyl amino, etc.

A further class of N-halogenated amine compounds useful in accordance with the invention are heterocyclic fused ring systems containing a nitrogen atom substituted with chlorine or bromine or compounds containing an electro-negative aromatic nucleus bound to the halogenated nitrogen atom, as for example compounds having the formula:

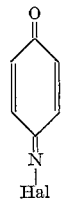

Examples of classes of N-halogenated amino compounds useful in accordance with the invention include N-halogenated amides such as N-chloroacetamide, N-bromoacetamide, N-bromobenzamide, N-chlorobutyrolactam, N-chloronicotinamide, N,N'-dichloroterephthalamide, N-chlorourea and N,N-dichlorostearamide; N-halogenated imides such as N-chlorosuccinimide, N-bromosuccinimide, N-chlorobiuret, N-bromophthalimide, N-chlorocyclohexene dicarboximide, N,N'-dichloropyromellitimide, N-chlorosaccharin; N-halogenated sulfonamides such as N-chloro-B-anthraquinone sulfonamide, N-chlorobenzenesulfonamide, N-ethyl, N-chlorobenzenesulfonamide, N,N'-dichlorotoluenesulfonamide, N-bromonaphthalenesulfonamide and N,N'-dichloronaphthalenedisulfonamide; chloramine B, chloramine T; N-halogenated heterocyclic compounds such as chloromelamine, dichloromelamine, trichloromelamine, trichloroisocyanuric acid, tetrachlorouric acid, dichloroisocyanuric acid, N-chloroisatin, monochloroisocyanuric acid and its salts, N-chlorooxindole, N-chlorocarbazole, 5,5-dimethyl-N-chlorohydantoin, 5-methyl-5-phenyl-N,N'-dichlorohydantoin, N-bromobarbituric acid, N,N'-dichloro-2,5-diketo piperazine, N-chlorophenothiazine, N,N'-dichloroalloxan, N-bromorhodanine; N-halogenated quinone imides such as N,N'-dichlorobenzoquinoneimide and N-bromo-tetrachlorobenzoquinoneimide.

The N-halogenated amine compounds may be applied to the surface of the polymer treated in any desired manner though it has been found preferable to apply the same in the form of a solution in a volatile solvent. Examples of solvent which may be used include diethyl ether, di-isopropyl ether, methylene chloride, chloroform, benzene, tetrahydrofuran, dimethyl formamide. Concentrations of the N-halogenated amine compound in the solvent of from 0.1% to 50% and preferably 1% to 20% may conveniently be used.

The amount of the N-halogenated amine compound applied to the polymer surface may vary from as little as $10^{-5}$ grams/sq. in. to .5 of a gram/sq. in. but is preferably used in amounts of $10^{-4}$ grams/sq. in. to $10^{-3}$ grams/sq. in.

After the application of the N-halogenated amine compound, as for example, as such or in a volatile solvent with drying by evaporation of the solvent, the coated polymer is subjected to a thermal treatment to pyrolyze the coating. For this purpose temperatures of at least 90° C. are generally required with the upper limit being determined by the polymer, in that temperatures which detrimentally affect the polymer should not be used. It is preferable to maintain the temperature below the melting point and most preferably below the softening point of the polymer with temperatures in the range of 100–200° C. being most commonly used. The time required for the pyrolysis varies with the temperature used but is generally in the range of 1 to 150 seconds.

Completion of pyrolysis may be determined by visual inspection of transparent films. Film which has received insufficient thermal treatment remains cloudy in appearance. The cloudiness disappears upon completion of pyrolysis. Also, vapor is produced in the thermal treatment and completion of pyrolysis is signalled when the evolution of vapor ceases.

After treatment, the polymer may be bonded to other materials using the conventional adhesive binding agents and have been found to be more receptive to printing inks and dyes. Thus, for example, the polymer which may be in the form of any solid body, as for example a fiber, filament, textile, or film may be surface treated in accordance with the invention and thereafter may be bonded using animal glues; polyamide adhesives including modified "soluble" nylons; epoxy resins; polyester resins, phenol-formaldehyde; polyvinyl acetate emulsions, acrylic emulsions or solutions; polyvinyl ethers; butadiene-acrylonitrile copolymer emulsions; phenolic modified rubber based adhesives; neoprene cements; isocyanate based materials; polyvinylacetals; melamine formulations; styrene-butadiene copolymers; cyanoacrylates; butyl rubber latices; polyisobutylene, modified silicones; nitrocellulose; and carboxylic elastomers, and is more receptive to dyes such as nigrosines, indulines, azo dyes, anthraquinones, acid chromes, and basic dyes and printing inks such as suitable printing inks including pigmented solutions or emulsions of various varnishes, shellacs, lacquers, polyacrylates, polyvinyl acetate, polyamides such as Zein, vinyls, nitrocellulose, cellulose acetate, ethyl cellulose, rubber, etc.

The bonding may be to any surface as for example leather, fabrics, glass, wood, metals, ceramics, photo emulsions, etc. Of particular importance is rubber such as in bonding plastic reinforcing fibers to tire stock.

In order to effect a stronger bond it is preferable to effect the thermal treatment while the coated polymer is in contact with the adhesive. Thus, the coating may be applied to the polymer, and the adhesive applied in the conventional manner between the coated polymer surface and the surface to which the polymer is to be bonded and thereafter the thermal treatment is effected. Alternately, the halogenated amine compound may be incorporated into the adhesive, and the adhesive used in the conventional manner with the thermal treatment effected after the surfaces to be bonded are positioned together with the adhesive therebetween.

In accordance with a further embodiment of the invention, the polymers may be directly bonded to another surface by applying the coating of the N-halogenated amine compound as described by affecting the thermal treatment while pressing the coated polymer against the surface to which it is to be bonded. For this purpose, sufficient pressure need only be applied to maintain the contact though pressures from 0.5 to 200 lbs. per sq. in. are preferred. In this manner, the organic high polymers may be bonded to each other or to different polymers or to different materials. Thus, for example, strong bonds of polyethylene-terephthalate to polyethylene terephthalate, polyethylene-terephthalate to rubber, and polyethylene-terephthalate to metals, such as copper or aluminum or to polyacetals or polyacetals to metals, such as aluminum or copper may be formed.

It is also possible to incorporate the N-halogenated amine compound directly into the polymer, as for example, compounding the same with the polymer. After the thermal treatment of the compounded mixture the polymer material will be more receptive to adhesives, printing inks, dyes and the like. The compounded mixture may thus be molded or pressed at the elevated temperature sufficient to cause pyrolysis of the amine compound and may, for example, be directly heat-bonded to another material to form a laminate, or to be used as a heat-settable adhesive.

While the treatment in accordance with the invention beneficially modifies the surface characteristics of the polymer, allowing the bonding and the like, the same does so without adversely affecting the other desirable properties of the polymer, as for example its mechanical properties and appearance. Thus, when treating polymers in accordance with the invention, there is no significant reduction in the yield point, tensile modulus, tensile strength or elongation to break.

The following examples are given by way of illustration and not limitation:

Example 1

72 sq. in. of 0.5 mil Mylar film (polyethyleneterephthalate sold by the Du Pont Company of Wilmington, Del.) was coated with 1 milliliter of an ether solution containing 0.02 g. of N,N-dichlorobenzene sulfonamide per ml. After evaporation of the ether, the sheet was folded in half with the coated sides facing each other and pressed lightly at 340° F. for 10 seconds. The laminate could not be separated without tearing the Mylar.

Example 2

Example 1 was repeated using Mylar having a thickness of 5 mils. Again the laminate could not be separated without tearing the Mylar.

Example 3

Example 2 was repeated using N-chlorosuccinimide at the same concentration in acetone in place of N,N-dichlorobenzene sulfonamide. The films adhered strongly and could not be separated without tearing.

Example 4

Example 3 was repeated using trichloromelamine in dimethyl formamide.

Example 5

72 sq. in. of Mylar was coated as in Example 1. The film was then heated at 350° F. for 10 seconds to pyrolyze the coating. The treated sheet was then coated with a polyvinyl acetate emulsion adhesive, folded in half, pressed together and allowed to dry.

An untreated sheet of Mylar was coated with adhesive in the same manner. After 6 hours' drying, the treated laminate could not be separated without tearing the Mylar. The laminate of the untreated Mylar separated easily.

Example 6

Example 5 was repeated using a tetrahydrofuran solution of a vinyl chloride-vinyl alcohol copolymer as the adhesive. Similar results were obtained.

Example 7

Example 5 was repeated using a methanol-water solution containing 20% of Belding Chemical Industries 817, a modified nylon, as the adhesive. Similar results were obtained.

Example 8

Example 5 was repeated using a 10% solution of SBR gum rubber in benzene as the adhesive. The laminate showed a peel strength of 2.5 lbs. per inch. A laminate prepared from untreated Mylar showed a peel strength of less than one pound per inch.

Example 9

Mylar film, having a thickness of 0.5 ml., was coated with $2.8 \times 10^{-4}$ g./sq. in. of N,N-dichlorobenzene sulfonamide.

The sheet was folded in half and a sheet of SBR gum rubber was placed between them. The laminate was pressed lightly at 340° F. for 10 secs. The laminate showed a peel strength of 3.5 lbs./in.

Example 10

A sheet of 0.5 mil Mylar, coated as in Example 9 was laminated with a film of Celcon (a polyacetal sold by Celanese) after light pressing for 5 seconds at 360° F., the laminate could not be separated without tearing the Mylar.

Example 11

Example 10 was repeated using Delrin (a polyacetal film sold by Du Pont). Similar results were obtained.

Example 12

A sheet of 0.5 mil Mylar, coated as in Example 9, was laminated with aluminum foil by pressing at 360° F. for five seconds. The laminate could be separated without tearing the film, but showed a peel strength of 1.5 lbs./in.

Example 13

A sample of polyacetal film (Delrin) was coated with $2.8 \times 10^{-4}$ g./sq. in. of N,N-dichlorobenzene sulfonamide. The sheet was laminated with aluminum foil by pressing lightly at 345° F. for 10 seconds. The laminate could be separated, but showed a peel strength of 1 lb./in.

Example 14

A Mylar sheet, one mil in thickness, was coated with $3.4 \times 10^{-4}$ g./sq. in. of N-chlorosuccinimide. A 5 mil coating of emulsified polyethylene was then applied to the surface and allowed to dry. The film was then folded in half with the coated surfaces facing each other and pressed at 350° F. for 5 seconds. The laminate could be separated but the polyethylene wax adhered evenly to both surfaces. The polyethylene wax coated film was then laminated with a film of low density polyethylene at 300° F. for 10 sec. The resulting laminate showed a peel strength of 1 lb./in.

Example 15

Mylar film, 0.5 mil in thickness was coated with $3.3 \times 10^{-4}$ g./sq. in. of N-bromosuccinimide from ether solution. The film was then heated at 340° F. for 30 seconds to pyrolyze the coating. The film was then rinsed with acetone.

(A) The treated film was then coated with a 2 mil thickness (dry) of a polyvinyl acetate emulsion adhesive and allowed to dry. The coating was then subjected to the pressure sensitive strip test in which several diagonal cuts at right angles to each other are made in the coating. Scotch brand tape sold by Triple M is then firmly applied over the cut area and ripped off. None of the coating was removed by this procedure. The film was then folded in half and pressed together at 300° F. After cooling, the laminate could not be separated without tearing the film.

(B) (A) was repeated using a 20% solution of VAGH, a vinyl chloride-vinyl alcohol copolymer sold by Union Carbide in tetrahydrofuran as the adhesive. Similar results were obtained.

(C) (A) was repeated using a 20% solution of "soluble" nylon. Similar results were obtained.

Example 16

Polypropylene film, 1.0 mil thick, was coated with $1.4 \times 10^{-4}$ g./sq. in. of N,N-dichlorobenzene sulfonamide. The film was then heated at 290° F. for 2 minutes. A sample of the treated film and a specimen of untreated polypropylene film were coated with an 8 mil thickness (wet) of DAREX×74–1, a pressure sensitive acrylic emulsion adhesive sold by Dewey and Almy.

After drying 3 hours at 110° F., the films were folded in half and secured with a rubber roller. The laminate of the untreated film could be readily separated. The adhesive stripped cleanly from the plastic surface. The laminate of the treated film could not be separated without distortion and tearing of the film. Where separation did occur, the adhesive adhered evenly to both surfaces.

Example 17

Mylar film was coated to a dry thickness of 2.0 mils with a methylene chloride solution containing 10 g. of cis-polybutadiene and 1.0 g. of N,N-dichlorobenzenesulfonamide. The coated dried film was folded in half with the coated surfaces facing each other. The laminate was then pressed lightly at 340° F. for 10 seconds. Excellent adhesion of the polybutadiene was obtained.

Example 18

A clean steel sheet was coated with $1 \times 10^{-3}$ g./sq. in. of N,N-dichlorobenzenesulfonamide from methylene chloride solution. The coated steel was laminated with .010 inch rigid polyvinyl chloride sheet at 300° F. for 2 seconds under 10 p.s.i. The resulting laminate showed a peel strength (90°) of 6 lbs. per inch.

Example 19

Mylar film was coated with $5 \times 10^{-4}$ g./sq. in. of N,N-dichlorobenzenesulfonamide. The coating was then pyrolized in a bath of methacrylic acid vapor (162° C.). The resulting film was washed thoroughly with water and acetone to remove residual monomeric or homopolymeric methacrylic acid. The film surface was then printed with stamp-pad ink and allowed to dry. The ink was not removed by a pressure sensitive adhesive tape strip test. In an identical test, conducted with untreated Mylar, the ink stripped cleanly from the film.

Example 20

Polybutene-1 was compounded with 4% N,N-dichlorobenzene sulfonamide and 1% sulfur. The composition was then molded between lapped steel sheets at 335° F. for 15 minutes. The steel adhered strongly to the compounded polymer. In tensile testing the laminate showed a shear strength of over 1000 p.s.i.

Example 21

Any of the examples may be repeated using any of the N-halogen amines mentioned hereabove. In addition, in place of the polymers mentioned, any of the polymers mentioned hereabove may be treated.

While the invention has been described in detail with reference to certain specific embodiments, various changes and modifications which fall within the spirit of the invention and scope of the appended claims will become apparent to the skilled artisan.

I claim:

1. A process for the surface treatment of hydrogen-containing organic high polymers which comprises contacting the polymer surface with an electro negative organic amine compound halogenated at the nitrogen atom with a member selected from the group consisting of chlorine and bromine at a temperature of at least 90° C. to cause pyrolysis of said amine compound.

2. Process according to claim 1 in which said heating is effected at a temperature below the softening point of the polymer.

3. Process according to claim 1 in which the polymer is contacted with said amine compound by applying said amine compound in solution in a volatile solvent and evaporating the solvent.

4. Process according to claim 1 in which said organic high polymer is a member selected from the group consisting of polyesters, polyacetals, polycarbonates, polyolefins, polyamides, epoxide resins, melamine resins, vinyl resins, phenolic resins, and ureaformaldehyde resins.

5. Process according to claim 1 in which said amine compound is a member selected from the group consisting of N-chloroacetamide, N-bromoacetamide, N-bromobenzamide, N - chlorobutylrolactam, N - chloronicotinamide, N,N'-dichloroterephthalamide, N-chlorourea and N,N-dichlorostearamide, N-chlorosuccinimide, N-bromosuccinimide, N-chlorobiuret, N-bromophthalimide, N-chlorosyclohexene dicarboximide, N-N'-dichloropyromellitimide, N-chlorosaccharin, N-chloro-B-anthraquinonesulfonamide, N-chlorobenzenesulfonamide, N-ethyl, N - chlorobenzenesulfonamide, N,N' - dichlorotoluenesulfonamide, N - bromonaphthalenesulfonamide, N,N'-dichloronaphthalenedisulfonamide, chloramine - B, chloramine-T, chloromelamine, dichloromelamine, trichloromelamine, trichloroisocyanuric acid, tetrachlorouric acid, dichloroisocyanuric acid, N-chloroisatin, monochloroisocyanuric acid and its salts, N-chlorooxindole, 5,5-dimethyl-N-chlorohydantoin, N-chlorocarbazole, 5-methyl-5-phenyl - N,N' - dichlorohydantoin, N-bromobarbituric acid, N,N' - dichloro-2,5-diketo-piperazine, N-chlorophenothiazine, N,N'-dichloroalloxan, N-bromorhodanine, N,N'-dichlorobenzoquinoneimide and N-bromo-tetrachlorobenzoquinoneimide.

6. Process according to claim 1 in which said organic high polymer is polyethylene-terephthalate.

7. Process according to claim 1 in which said amine compound is initially applied to the surface of the organic high polymer in solution in a volatile solvent, the volatile solvent evaporated leaving the compound in concentration of $10^{-5}$—.5 gram per sq. in., and thereafter the compound is heated to a temperature of at least 90° C. to cause pyrolysis thereof.

8. Process according to claim 7 in which a compound is applied with a concentration of $10^{-4}$–$10^{-3}$ grams per sq. in.

9. Process according to claim 1 which includes bonding the treated polymer surface to another surface with a bonding agent.

10. Process for bonding hydrogen-containing organic high polymers which comprises contacting the polymer surface with the surface of the material to be bonded thereto while maintaining an electro negative organic amine compound halogenated at the nitrogen atom with a member selected from the group consisting of chlorine and bromine therebetween and heating said amine compound to a temperature of at least 90° C. to cause pyrolysis thereof.

11. Process according to claim 10 in which said heating is effected to a temperature below the softening point of the polymer.

12. Process according to claim 10 in which said organic high polymer is a member selected from the group consisting of polyesters, polyacetyls, polycarbonates, polyolefins, polyamides, epoxide resins, melamine resins, vinyl resins, phenolic resins, and ureaformaldehyde resins.

13. Process according to claim 10 in which said polymer is polyethylene-terephthalate.

14. Process according to claim 13 in which the polyethyleneterephthalate is bonded to another polyethyleneterephthalate surface.

15. Process according to claim 10 in which said amine compound is used in a concentration of between $10^{-5}$ and .5 gram per sq. in.

16. Process according to claim 15 in which said amine compound is used in a concentration between $10^{-4}$ and $10^{-3}$ grams per square inch.

17. Process according to claim 10 in which the amine compound is initially applied to the surface of the polymer in a solvent solution containing a volatile solvent, the solution dried by solvent evaporation, and thereafter the coated surface is contacted with the surface of the material to be bonded thereto and heated.

18. Process according to claim 10 which includes maintaining an adhesive material between the surfaces being bonded during said heating.

19. Process according to claim 10 in which said amine compound is in admixture with an adhesive material.

20. Process according to claim 10 in which said amine compound is compounded with the polymer prior to said contacting with the surface of the material to be bonded.

21. Process according to claim 20 in which the polymer is positioned between two surfaces to bond the same together.

22. Process according to claim 10 in which said amine compound is a member selected from the group consisting of N-chloracetamide,
N-bromoacetamide,
N-bromobenzamide,
N-chlorobutyrolactam,
N-chloronicotinamide,
N,N'-dichloroterephthalamide,
N-chlorourea,
N,N-dichlorostearamide,
N-chlorosuccinimide,
N-bromosuccinimide,
N-chlorobiuret,
N-bromophthalimide,
N-chlorocyclohexene dicarboximide,
N,N'-dichloropyromellitimide,
N-chlorosaccarin,
N-chloro-B-anthra-quinone-sulfonamide,
N-chlorobenzenesulfonamide,
N-ethyl,
N-chlorobenzenesulfonamide,
N,N'-dichlorotoluenesulfonamide,
N-bromonaphthalenesulfonamide,
chloramine-B chloramine T,
N,N'-(dichloronaphthalenedisulfonamide,
chloromelamine,
dichloromelamine,
trichloromelamine,
trichloroisocyanuric acid,
tetrachlorouric acid,
dichloroisocyanuric acid,
N-chloroisatin,
monochloroisocyanuric acid and its salts,
N-chlorooxindole,
5,5-dimethyl-N-chlorohydantoin,
N-chlorocarbazole,
5-methyl-5-phenyl-N,N'-dichlorohydantoin,
N-bromobarbituric acid,
N,N'-dichloro-2,5-diketo-piperazine,
N-chlorophenothiazine,
N,N'-dichloroalloxan,
N-bromorhodanine,
N,N'-dichlorobenzoquinoneimide, and
N-bromo-tetrachlorobenzoquinoneimide.

23. An organic high polymer surface treated by the process according to claim 1.

24. A laminate formed by the process of claim 10.

References Cited

UNITED STATES PATENTS

| | | | |
|---|---|---|---|
| 2,622,056 | 12/1952 | DeCoudres et al. | 156—333 X |
| 2,801,447 | 8/1957 | Wolinski. | |
| 2,911,321 | 11/1959 | Hermann et al. | 117—76 |
| 2,919,059 | 12/1959 | Sporka | 229—2.5 |
| 3,013,915 | 12/1961 | Morgan | 156—307 X |
| 3,022,192 | 2/1962 | Brandt | 161—231 |
| 3,056,705 | 10/1962 | Wong et al. | |
| 3,201,302 | 8/1965 | Williams et al. | 156—307 X |
| 3,235,426 | 2/1966 | Bruner | 156—307 X |

EARL M. BERGERT, *Primary Examiner.*

CLIFTON B. COSBY, *Examiner.*